(12) United States Patent
Kourkoumelis

(10) Patent No.: US 7,644,945 B1
(45) Date of Patent: Jan. 12, 2010

(54) RESTRAINING DEVICE FOR CHILD'S TWO-WHEELED BICYCLE TRAINING

(76) Inventor: Vasilios Kourkoumelis, 3410 Galt Ocean Dr., Fort Lauderdale, FL (US) 33308

( * ) Notice: Subject to any disclaimer, the term of this patent is extended or adjusted under 35 U.S.C. 154(b) by 67 days.

(21) Appl. No.: 11/740,468

(22) Filed: Apr. 26, 2007

(51) Int. Cl.
*B62H 7/00* (2006.01)
*F16B 9/02* (2006.01)

(52) U.S. Cl. .............. 280/293; 280/288.4; 280/298; 280/304.5; 403/234; 403/233; 403/235; 403/262

(58) Field of Classification Search ........... 280/293, 280/288.4, 298, 304.5; 403/234, 233, 235, 403/262
See application file for complete search history.

(56) References Cited

U.S. PATENT DOCUMENTS

| | | | | |
|---|---|---|---|---|
| 581,309 | A * | 4/1897 | Savell | 280/292 |
| 675,453 | A * | 6/1901 | Sturgess | 280/292 |
| D334,960 | S * | 4/1993 | Goodman | D21/777 |
| 5,382,040 | A | 1/1995 | Nanassi | |
| 5,401,070 | A * | 3/1995 | LePelley | 294/1.1 |
| 5,531,494 | A | 7/1996 | Singleton | |
| 5,890,456 | A * | 4/1999 | Tancrede | 119/794 |
| 6,349,958 | B1 | 2/2002 | Gawlik | |
| 6,474,270 | B1 * | 11/2002 | Imes | 119/796 |
| 6,488,302 | B2 | 12/2002 | Coates | |
| 6,607,208 | B2 * | 8/2003 | Dartland | 280/292 |
| 7,334,808 | B2 * | 2/2008 | Fatzinger | 280/292 |

* cited by examiner

*Primary Examiner*—Kevin Hurley
*Assistant Examiner*—Marlon A Arce
(74) *Attorney, Agent, or Firm*—Malin Haley DiMaggio Bowen & Lhota

(57) ABSTRACT

A safety device for restraining the forward movement of a two-wheeled bicycle used for training a child, said device including a cord controller that allows for the extending, retracting and locking said cord to a manual handle, a spring clip fastener on the free end of said cord and a flexible strap that connects at one end by a loop to a bicycle seat post with the other end to a fastening ring that allows the ring to be fastened to the spring clip on the cord. The cord controller allows the user to walk behind a young child who is learning to ride a two-wheeled bike to prevent the child from accelerating away from the adult during training whereby the adult can restrain the forward movement of the bicycle whenever necessary.

2 Claims, 3 Drawing Sheets

RESTRAINING DEVICE FOR CHILD'S TWO-WHEELED BICYCLE TRAINING

BACKGROUND OF THE INVENTION

1. Field of the Invention

This invention relates generally to a safety device for teaching a child how to ride a two-wheeled bicycle that includes training wheels and, specifically, to an extendable, lockable strap restraint that connects to a two-wheeled bicycle to prevent a child from speeding away from an adult supervisor while the child is learning to ride a bicycle.

2. Description of Related Art

Teaching a child to ride a two-wheeled bicycle is a common activity for parents of a young child. Typically, training begins on a two-wheeled bicycle that has training wheels to prevent the bicycle from falling over. With the training, the child's confidence can be gained while learning how to balance the bicycle in motion. A safety problem arises because a child can quickly learn to accelerate a two-wheeled bicycle (even with training wheels) away from the adult supervisor during the training. Such lunging or lurching motion, where the child accelerates the bicycle, can result in a very dangerous move for the child especially around other people or traffic. Therefore, a suitable restraint device is necessary to protect the child from bolting away from the adult supervisor. Holding onto the bicycle by an adult during training can be very uncomfortable because of having to bend down to grasp the bicycle.

Devices have been shown in the prior art to aid in the ability of an adult who properly teaches and supervises a child while the child is learning to ride a bicycle. Examples are found in U.S. Pat. No. 6,488,302 issued Coates on Dec. 3, 2002 entitled "Bicycle Training Handle." Another example is found in U.S. Pat. No. 6,349,958 issued to Gawlik on Feb. 26, 2002 entitled "Bicycle Training Device." Both of these devices use rigid bars connected to a portion of the bicycle for balancing the child learning. The bar is rigid and not retractable or extendable.

Other examples are found in U.S. Pat. No. 5,382,040 issued to Nanassi on Jan. 17, 1995 entitled "Bicycle Training Aid" and U.S. Pat. No. 5,531,494 issued to Singleton on Jul. 2, 1996 entitled "Handle for Control of Mobile Riding Toys." The '040 patent teaches a strap attached to the rider's back while the '494 patent uses a handle that is detachable to the bicycle.

In order to achieve the benefit of training, the child must have moments where the adult is not holding the bike rigidly in an upright position but allows the child to feel the normal operation of the bicycle. However, the child and the bicycle must be restrained or have the ability to restrain of necessity if the child should try to accelerate rapidly away from the adult supervisor. Also, the supervisor needs to be able to control the bicycle from a comfortable position.

SUMMARY OF THE INVENTION

A safety and restraining device for controlling and restricting the movement of a two-wheeled bicycle that typically includes training wheels for training a child who is learning to operate the bicycle. The purpose of the device is to prevent the child from accelerating away from the adult supervising the training and to provide a comfortable position for the supervisor during training.

The safety device comprises a short strap constructed of nylon having a formed loop in one end that is sized to fit around the post of a bicycle seat and a spring clip fastener for quick release at the other end of the strap. The device further includes an extensible flexible cord leash that includes a handle, a spool or reel having a cord that can be releasably extended or retracted into a housing attached to the handle and a spring clip mounted at the free end of the cord.

The cord extension and retraction device is known in the prior art and is often used as a leash. An example is shown in U.S. Pat. No. 3,315,642 that includes a cord or a flexible leash line controller attached to a reel mounted in a housing that may include springs for recoiling the reel and a locking button for stopping the release of the cord. The cord also has a spring clip attached thereto. Other examples in the prior art are shown in U.S. Pat. No. 5,377,626 which is lunge line controller used for exercising. This device also includes a locking position to hold the cord or strap in a specific length or to stop the cord in motion from extending any further relative to the housing. In accordance with the invention, the extendable animal leash or the lunge line controller does not in itself form a patentable part of this invention but is an essential element in the utilization of the invention.

The cord or leash line controller which has a suitable handle for grasping and a cord locking button that allows the cord to be locked on the reel in place or extended up to a fixed maximum which represents a separation between the adult supervisor holding the cord controller and the bicycle seat. In one embodiment, the device includes an extendable and retractable leash sold by Coastal Pet Products, Inc. of Alliance, Ohio under the registered trademark Control Ease.

The bicycle fastening strap, which could be a nylon strap, has a loop sewn into one end and the size of the loop diameter is slightly larger than a conventional bicycle seat post that is rigidly and firmly attached to the bicycle. Thus, in order to attach the fastening strap to the bicycle seat post, the bicycle seat is mechanically disconnected from the bicycle and the strap loop end placed around the post and then the bicycle seat is then reattached firmly to the bicycle.

Because of the short length of the bicycle fastening strap, the fastening strap can stay on the bicycle even when not training the child. The fastening strap includes a quick release end connector that can be attached to a spring clip that is at the end of the retractable controller cord. Thus, to engage the cord controller to the bicycle, a spring clip on the end of the cord is quickly attached to the spring clip fastener that is connected permanently to the bicycle fastening strap. In one embodiment, this could be a large metal ring permanently fastened to the strap at one end.

To operate the device, the adult supervisor attaches the string clip to the strap through the spring clip fastener.

The adult supervisor unlocks the cord contained in the controller housing to let out a fixed amount of cord to allow sufficient room for the adult supervisor while maintaining a comfortable posture to walk behind the child learning to ride the bicycle without much slack. The cord distance can be easily adjusted by moving the cord controller mechanism that either locks or unlocks the cord within the housing which includes a reel and spring to let more cord out. If the child stops suddenly, the retraction mechanism in the cord controller can also retract cord quickly so that the cord does not get caught in the bicycle wheels or spokes if the child stops suddenly or slows down suddenly. Thus, using the cord controller, the adult supervisor can walk comfortably behind the child gauging different speeds and distances by adequately controlling the line and cord to the bicycle. Should the child try to bolt or accelerate quickly away from the adult supervisor, the cord will restrain the forward movement of the bicycle when the cord reaches the near limits on the cord controller. If the adult supervisor pushes a locking mechanism, the cord can be stopped.

Using the device, the child is protected from bolting away from the adult to prevent a dangerous situation. There is enough flexibility in the cord and strap to allow movement of the adult supervisor behind the bicycle without interfering with the training of the child.

It is an object of the system described herein to provide a safety restraint for use with a child who is learning to ride a two-wheeled bicycle that has training wheels to prevent the child from accelerating away from the adult supervisor.

It is another object of this invention to provide a line controller that can be quickly fastened or unfastened from a strap that can be attached to the bicycle for ease of installation or removal.

Another object of this invention is to provide a very flexible control strap for helping a child learn to ride a two-wheeled bicycle by an adult supervisor.

In accordance with these and other objects which will become apparent hereinafter, the instant invention will now be described with particular reference to the accompanying drawings.

DETAILED DESCRIPTION

Figure 1:
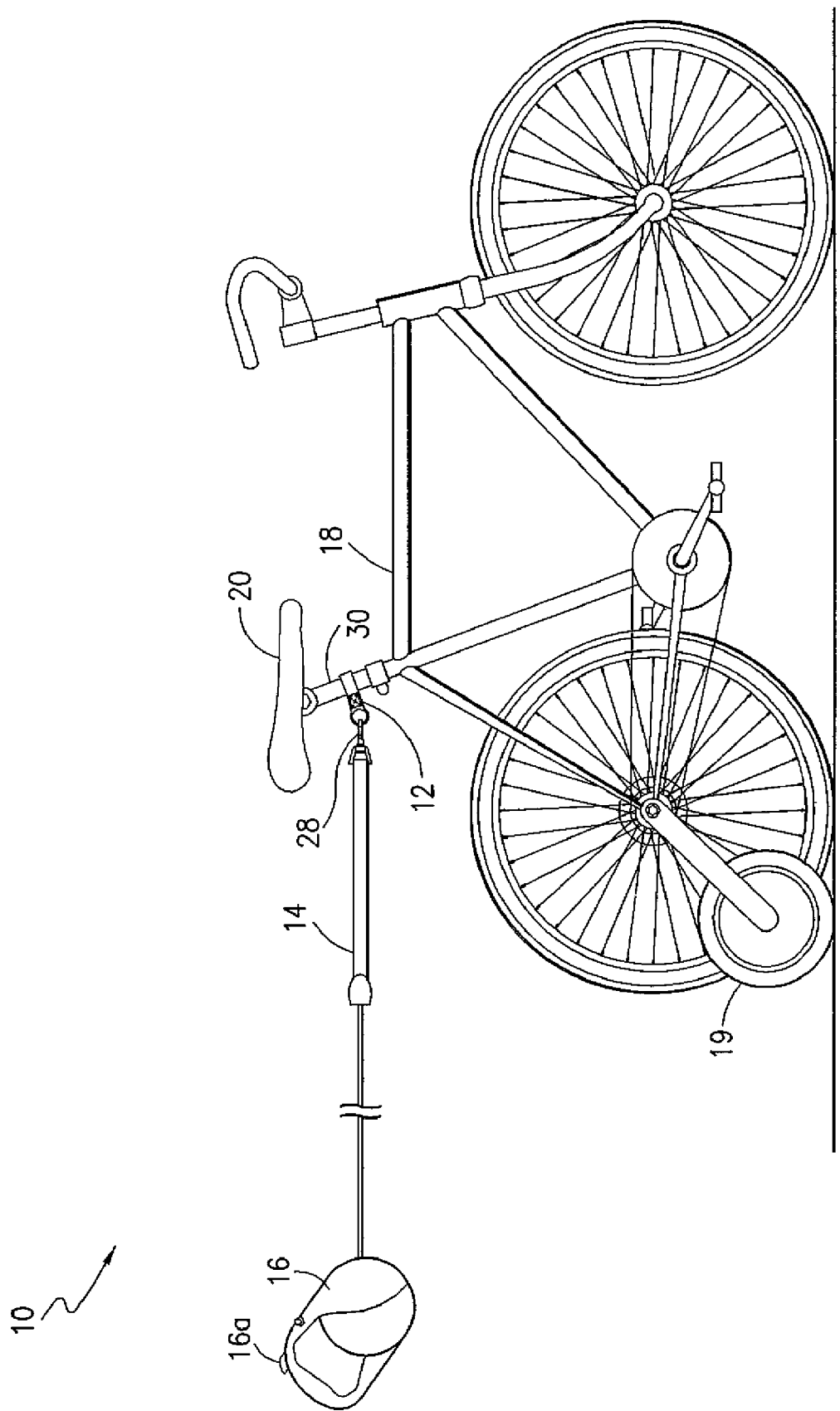
FIG. 1 shows a side elevational view of the safety device attached a two-wheeled bicycle having training wheels. The restraining cord is shown of indeterminate length.

Referring now to FIG. 1, the safety restraint device 10 is shown attached to a bicycle seat post 30 having training wheels 19. The safety restraint device comprises a flexible but strong bicycle fastening strap 12 which connects to the bicycle seat post 30 just below bicycle seat 20. The restraint device 10 further includes a hand-held line or cord controller 16 that has an extendable and retractable cord or line 14. The cord 14 includes a spring clip 28 connected to its free end 12. The cord or line controller 16 includes a reel or spool (not shown) for containing the cord or line 14, a spring mechanism (not shown) for retracting line 14 and a control button 16a that can lock the reel and line 14 in place to stop cord extension when necessary. The line or cord controller 16 is conventional and can be constructed as shown in U.S. Pat. No. 5,377,626 and U.S. Pat. No. 3,315,642, both of which patents are incorporated by reference herein. The cord controller 16 can be a leash that is extendable, lockable and retractable.

Figure 6:
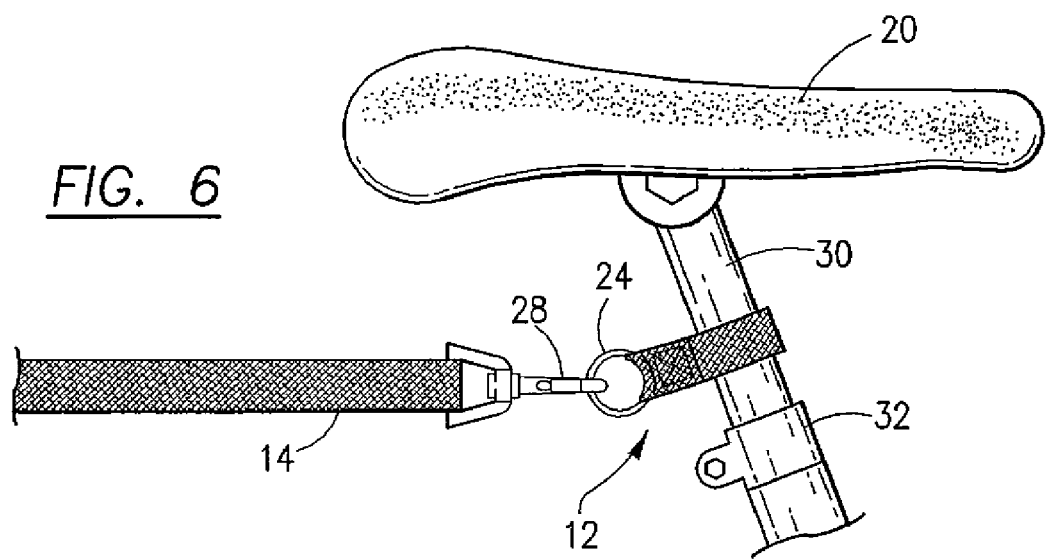
FIG. 6 shows a side elevational view of a cut away of a bicycle seat that includes the bicycle fastening strap and the retractable and extendable cord used in the present invention.

As shown in FIG. 1, the safety restraint 10 is thus connected by spring clip 28 to a spring clip fastener 24 shown in FIG. 6. The fastener 24 may be rigid metal or plastic ring that can easily receive a conventional spring clip that is manually actuated. FIG. 1 shows the device in operation such that the bicycle 18 and its forward movement can be restrained by the extendable cord 14 that is connected to the bicycle post 30 by the bicycle fastener 12.

To operate the device, the supervisor would grasp controller 16 manually after it has been fastened by spring clip 28 to the bicycle fastener strap 12 as shown in FIG. 1. The adult or supervisor or trainer would walk behind the bicycle and can control the length of cord 14 with control button 16a that allows for more slack or less slack to prevent the cord from interfering with the rotating bicycle wheel during operation. At the same time, if the child tries to accelerate quickly such as lunging or speeding the bike up, cord 14 can be stopped by pushing the control button or if the total amount of cord length is extended from the reel inside controller 16, the supervisor can physically stop the child on the bicycle from escaping from the supervisor. It is not necessary to explain the complete operation of the control of line or cord 14 that it inside of controller 16, but it does function as a conventional leash that includes extension, retraction and locking the cord at a fixed position.

Figure 2:
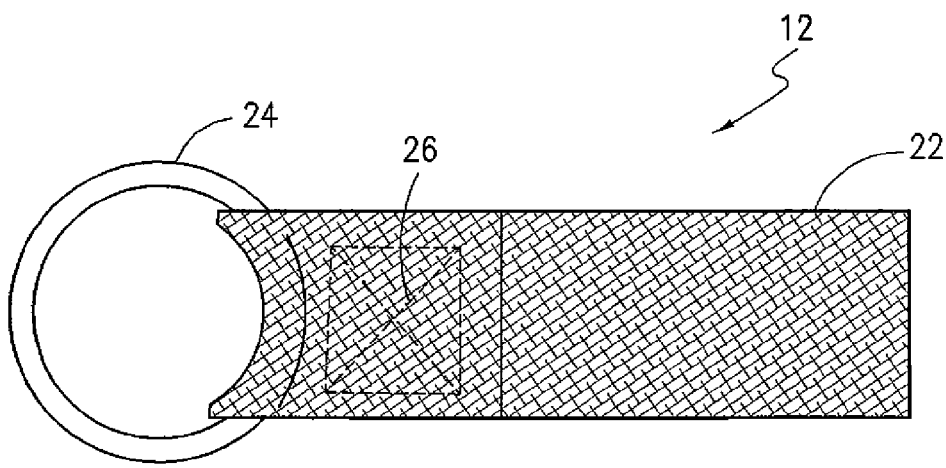
FIG. 2 shows a side elevational view of the bicycle fastening strap used with the present invention.
Figure 3:
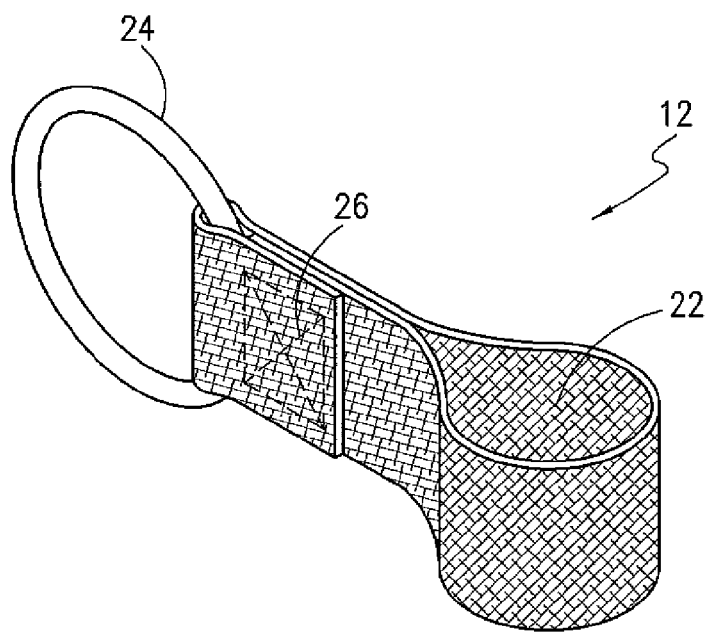
FIG. 3 shows a perspective view of the bicycle fastening strap.
Figure 4:
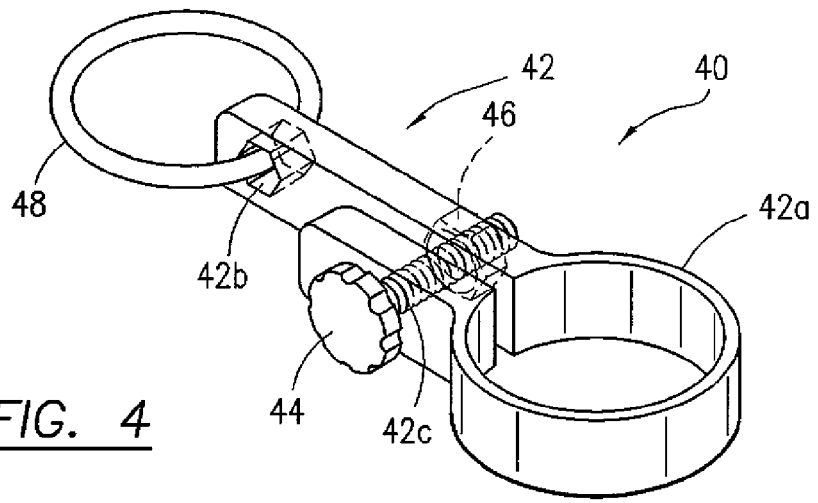
FIG. 4 shows a perspective view of an alternate embodiment of the invention that uses a rigid plastic clamp for attachment of the restraining cord to the bicycle post.
Figure 5:
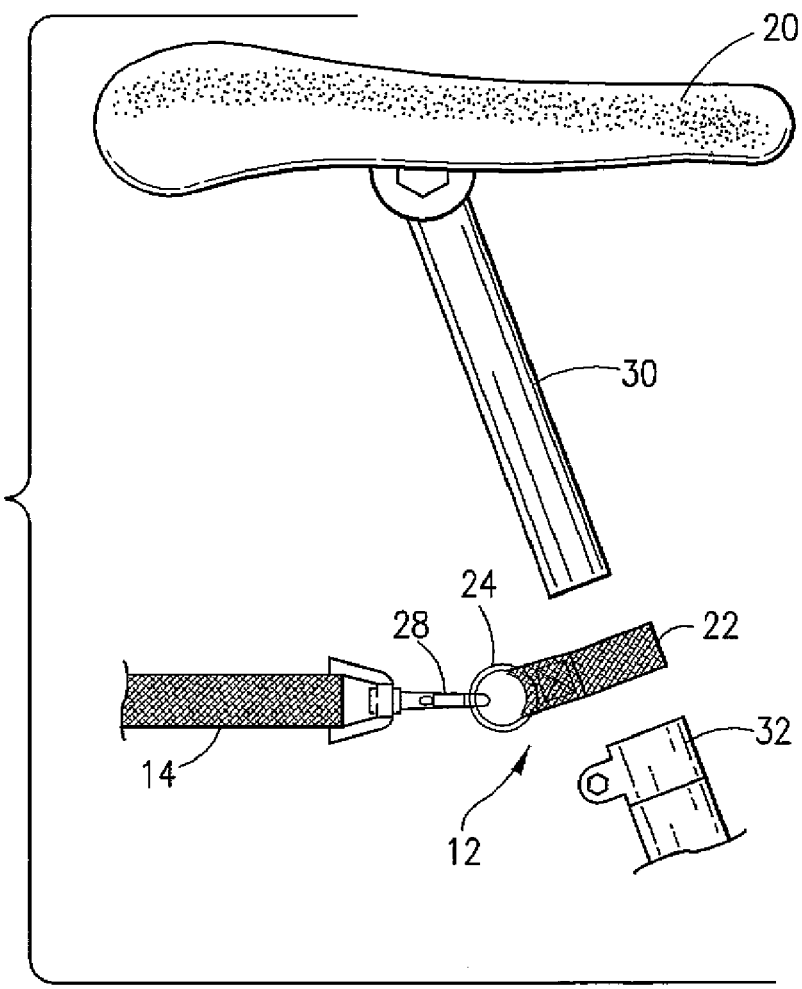
FIG. 5 shows a side elevational view partially cut away of a bicycle seat exploded from the bicycle to show attachment of the bicycle fastening strap and the retractable cord.

Referring now to FIGS. 2 and 3, an important element of the invention is shown as a bicycle fastener strap 12 that includes a self-contained loop 22 that is threadably attached to itself at one end and a spring clip fastener 24 shown as a rigid ring which is sewn and attached to strap 12. The strap 12 can be a nylon or a very strong synthetic fiber strap that includes a loop 22 that is also sewn together by threads 26 that fastens the spring clip fastener 24. The diameter of loop 22 is sized as shown in FIGS. 4 and 5 to fit around a rigid bicycle seat post 30. Thus, the strap 12 shown in FIGS. 2 and 3 can be permanently attached to a bicycle seat post and because of its shortness, which is just a relatively few inches long, it can remain there permanently even when the restraining cord is not attached thereto.

Referring now to FIG. 4, an alternate embodiment of the invention is shown in the form of a rigid plastic clip 40 that includes an annular ring body portion 42a that is sized in diameter to fit around the bicycle seat shaft 30 shown in FIGS. 4 and 5 as an alternative to the strap 12 shown in FIG. 3. The restraint cord fastener 40 includes a spring clip fastening ring 48 that is somewhere in construction to ring 24 shown in FIG. 3 for the fastening strap. In lieu of the strap 12 of FIG. 3, the clip 40 can be easily removed or attached to a bicycle seat post by using a threaded bolt 44 and a fastening nut 46 shown in phantom in FIG. 4 that tightens or loosens the size of the diameter of the clip annular ring or aperture 42a. The clip 40 also includes a passage 42b that holds the fastening ring 48 firmly to the clip 40. In order to attach clip 40 to a bicycle seat post the bolt 44 is removed and separated from nut 46 which allows the circular annular end 42a to be spread apart with sufficient flexibility to allow it to be separated and encircled around the bicycle seat post shown in FIGS. 5 and 6. Once the clip 40 has been attached to the bicycle post 30, then bolt 44 and nut fastener 46 are screwed together tightly so that the entire clip 40 fits tightly and projects in a rearward direction from the bicycle seat post 30. Bolt 44 fits through passage 42c. The tethered flexible cord and especially the spring clip can then be attached to ring 48. By using the clip 40 shown in FIG. 4, the entire clip can be easily attached or removed from a bicycle seat post without having to remove the post from the bicycle frame during installation or removal. Otherwise, the clip 40 functions very much and very similar to the fastening strap 12 shown in FIG. 3.

Referring now to FIGS. 5 and 6, the bicycle fastening strap 12 is shown attached to bicycle seat post 30 which is also connected to bicycle seat 20. A spring clip 28 is attached to ring 24. The spring clip 28 is also attached at the free end of cord 14 which is connected as shown in FIG. 1 to the cord controller 16.

Referring specifically to FIG. 5, the bicycle seat post 30 and seat 20 is shown exploded away from the frame mounting tube 32 that mounts to the bicycle 18 so that the loop 22 and bicycle fastening strap 12 is inserted around post 30 and then the post is further inserted in tube 32 where it is permanently locked in place by a locking bolt sleeve.

FIG. 6 shows the operating position of the fastening strap 12 as it is attached to cord 14 during operation of the device.

As shown in FIGS. 5 and 6, the bicycle fastening strap 12 is short enough to be mounted out of the way to the bicycle post 30 even when the device is not in use and will not interfere with the operation of the bicycle with or without training wheels. However, it is very easy to attach cord 14 to the bicycle fastening strap 12 merely by clicking it over ring 24.

An adult is not forced to be bent over or slouched over the child on the bicycle with the retractable leash which allows a person to stand in an erect position thus reducing back strain from bending over a long period of time.

Also, using the device prevents foot injuries from the training wheels. The adult is not uncomfortably on top of the child during training with the present safety device.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A device for restraining movement of a bicycle, said device comprising:
    a flexible cord having a loop at one end and a rigid ring at the opposite end;
    said loop being sized in diameter to receive a bicycle seat post;
    a flexible restraint line connected to said flexible cord ring through connection means;
    a line housing; said line housing containing said restraint line;
    a line control mechanism within said line housing including means for extending, retracting, and locking said restraint line relative to said line housing; said line control mechanism being activated through the application of manual force; and
    a line retraction mechanism within said line housing; said line retraction mechanism being activated through a ratchet spring device.

2. The device described in claim 1, wherein said flexible cord loop is removably set around a bicycle seat post.

* * * * *